(12) United States Patent
Endo et al.

(10) Patent No.: US 9,454,523 B2
(45) Date of Patent: Sep. 27, 2016

(54) NON-TRANSITORY COMPUTER-READABLE STORAGE MEDIUM FOR STORING ACRONYM-MANAGEMENT PROGRAM, ACRONYM-MANAGEMENT DEVICE, NON-TRANSITORY COMPUTER-READABLE STORAGE MEDIUM FOR STORING EXPANDED-DISPLAY PROGRAM, AND EXPANDED-DISPLAY DEVICE (71) Applicant: KYOCERA Document Solutions Inc., Osaka (JP)

(72) Inventors: Wataru Endo, Osaka (JP); Satoshi Kawakami, Osaka (JP); Yosuke Nakazato, Osaka (JP); Yoshitaka Matsuki, Osaka (JP); Masato Tanba, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 36 days.

(21) Appl. No.: 14/467,935

(22) Filed: Aug. 25, 2014

(65) Prior Publication Data

US 2015/0066480 A1 Mar. 5, 2015

(30) Foreign Application Priority Data

Sep. 5, 2013 (JP) ................................ 2013-184504

(51) Int. Cl.
*G06F 17/27* (2006.01)

(52) U.S. Cl.
CPC ......... *G06F 17/2765* (2013.01); *G06F 17/276* (2013.01)

(58) Field of Classification Search
CPC ......................... G06F 17/276; G06F 17/2765
See application file for complete search history.

(56) References Cited

U.S. PATENT DOCUMENTS

2003/0018670 A1* 1/2003 Ashford ............... G06F 17/278
715/236

FOREIGN PATENT DOCUMENTS

JP 2011-227749 A 11/2011

OTHER PUBLICATIONS

Hill, E., Fry, Z. P., Boyd, H., Sridhara, G., Novikova, Y., Pollock, L., & Vijay-Shanker, K. (May 2008). AMAP: automatically mining abbreviation expansions in programs to enhance software maintenance tools. In Proceedings of the 2008 international working conference on Mining software repositories (pp. 79-88). ACM.*
Jain, A., Cucerzan, S., & Azzam, S. (Aug. 2007). Acronym-expansion recognition and ranking on the web. In Information Reuse and Integration, 2007. IRI 2007. IEEE International Conference on (pp. 209-214). IEEE.*

(Continued)

*Primary Examiner* — King Poon
*Assistant Examiner* — Ibrahim Siddo
(74) *Attorney, Agent, or Firm* — Stein IP, LLC (57) ABSTRACT

An acronym-management program causes a computer to extracts an acronym from a list-updating reference for updating an acronym list; extracts, from the list-updating reference, a candidate for an expanded form corresponding to the extracted acronym; and, when the likelihood of the extracted acronym being used in the list-updating reference to refer to the extracted expanded-form candidate reaches or exceeds a specific level, increase, in the acronym list, the frequency corresponding to the acronym and the expanded form.

12 Claims, 9 Drawing Sheets

34b ACRONYM LIST

| ACRONYM | EXPANDED FORM | CATEGORY | FREQUENCY | . . . |
|---|---|---|---|---|
| ASP | Application Service Provider | Informatoin Technology | 15 | . . . |
| ASP | Active Server Page | Informatoin Technology | 6 | . . . |
| ASP | Affiliate Service Provider | Informatoin Technology | 4 | . . . |
| . . . | . . . | . . . | . . . | |

(56) References Cited

OTHER PUBLICATIONS

Emily (Hill, E., Fry, Z. P., Boyd, H., Sridhara, G., Novikova, Y., Poilock, L., & Vijay-Shanker, K. (May 2008), AMAP: automatically mining abbreviation expansions in programs to erbance software mairtenance tools. In Proceedings of d~e 2008 international working conference on Mining software repositories (pp. 79-88), ACM).*

Alpa (NPI..: Jain, A., Cucerzan, S & Azzam, S. (Aug. 2007), Acronym-expansion recognition and ranking on the web. In Information Reuse and #}tegration, 2007, iR12007. IEEE International Conference on (pp. 209-214). IEEE).*

* cited by examiner

34b ACRONYM LIST

| ACRONYM | EXPANDED FORM | CATEGORY | FREQUENCY | ... |
|---|---|---|---|---|
| ASP | Application Service Provider | Informatoin Technology | 15 | ... |
| ASP | Active Server Page | Informatoin Technology | 6 | ... |
| ASP | Affiliate Service Provider | Informatoin Technology | 4 | ... |
| ... | ... | ... | ... | |

Text box
┌─────────────────────────────────────────┐
│ This email inviting to you ASP project meeting. │
│                                         │
│ Meeting agenda is following:            │
│                                         │
│ Explain to you about ASP project.       │
│                                         │
│ And others topics.                      │
└─────────────────────────────────────────┘

FIG.7B

┌─────────────────────────────────────────┐
│ SELECT EXPANDED FORM?                   │
│  LIKELIHOOD OF EXPANDED FORM            │
│  CORREPSONDING TO ACRONYM IS:           │
│ 1. 60% Application Service Provider     │
│ 2. 24% Active Server Pages              │
│ 3. 16% Affiliate Service Provider       │
└─────────────────────────────────────────┘

Text box
┌─────────────────────────────────────────┐
│ This email inviting to you ASP project meeting. │
│                                         │
│ Meeting agenda is following:            │
│                                         │
│ Explain to you about ASP project.   │
│                                         │
│ And others topics.                      │
└─────────────────────────────────────────┘

FIG.8

Text box
This email inviting to you ASP(Application Service Provider) project meeting.

Meeting agenda is following:

Explain to you about ASP project.

And others topics.

NON-TRANSITORY COMPUTER-READABLE STORAGE MEDIUM FOR STORING ACRONYM-MANAGEMENT PROGRAM, ACRONYM-MANAGEMENT DEVICE, NON-TRANSITORY COMPUTER-READABLE STORAGE MEDIUM FOR STORING EXPANDED-DISPLAY PROGRAM, AND EXPANDED-DISPLAY DEVICE

CROSS-REFERENCE TO RELATED APPLICATIONS

This application is based on and claims the benefit of priority from the corresponding Japanese Patent Application No. 2013-184504 filed on Sep. 5, 2013, the entire contents of which are incorporated herein by reference.

BACKGROUND OF THE INVENTION

The present disclosure relates to acronyms, an acronym-management program for addressing the correspondence between the acronyms and expanded forms thereof, an acronym-management device, an expanded-display program, and an expanded-display device.

Acronyms are sometimes used because writing out terms comprising a plurality of words and phrases in expanded form is redundant, the acronyms being formed by connecting capital letters together or excerpting portions of the terms. A prior art method involves selecting expanded forms corresponding to acronyms, each of the expanded forms being selected based on the topic of a reference in which the acronym is included.

However, there are cases in which a single acronym is used as an acronym for a plurality of different expanded forms, even within a single field (the same technological field). For example, the acronym "MFP" may be used as an acronym for different expanded forms such as "multifunction peripheral," "multifunction product," and "multifunction printer." Therefore, automatically determining that one acronym is the acronym for one expanded form may not be appropriate.

SUMMARY OF THE INVENTION

A non-transitory computer-readable storage medium pertaining to an aspect of the present disclosure stores an acronym-management program for causing a computer to manage an acronym list in which acronyms, expanded forms corresponding to the acronyms, and frequencies with which the acronyms are used to refer to the expanded forms are correlated; extract an acronym from a list-updating reference for updating the acronym list; extract, from the list-updating reference, a candidate for the expanded form corresponding to the acronym extracted from the list-updating reference; and increase, in the acronym list, a frequency correlated with the acronym and the expanded form when the likelihood of the acronym extracted from the list-updating reference being used in the list-updating reference to refer to the extracted expanded-form candidate reaches or exceeds a specific level.

Further features and advantages of the present disclosure will become apparent from the description of embodiments given below.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

An embodiment of the present disclosure is described below with reference to the drawings.

First, the configuration of an acronym-management system 10 pertaining to the present embodiment will be described.

Figure 1:
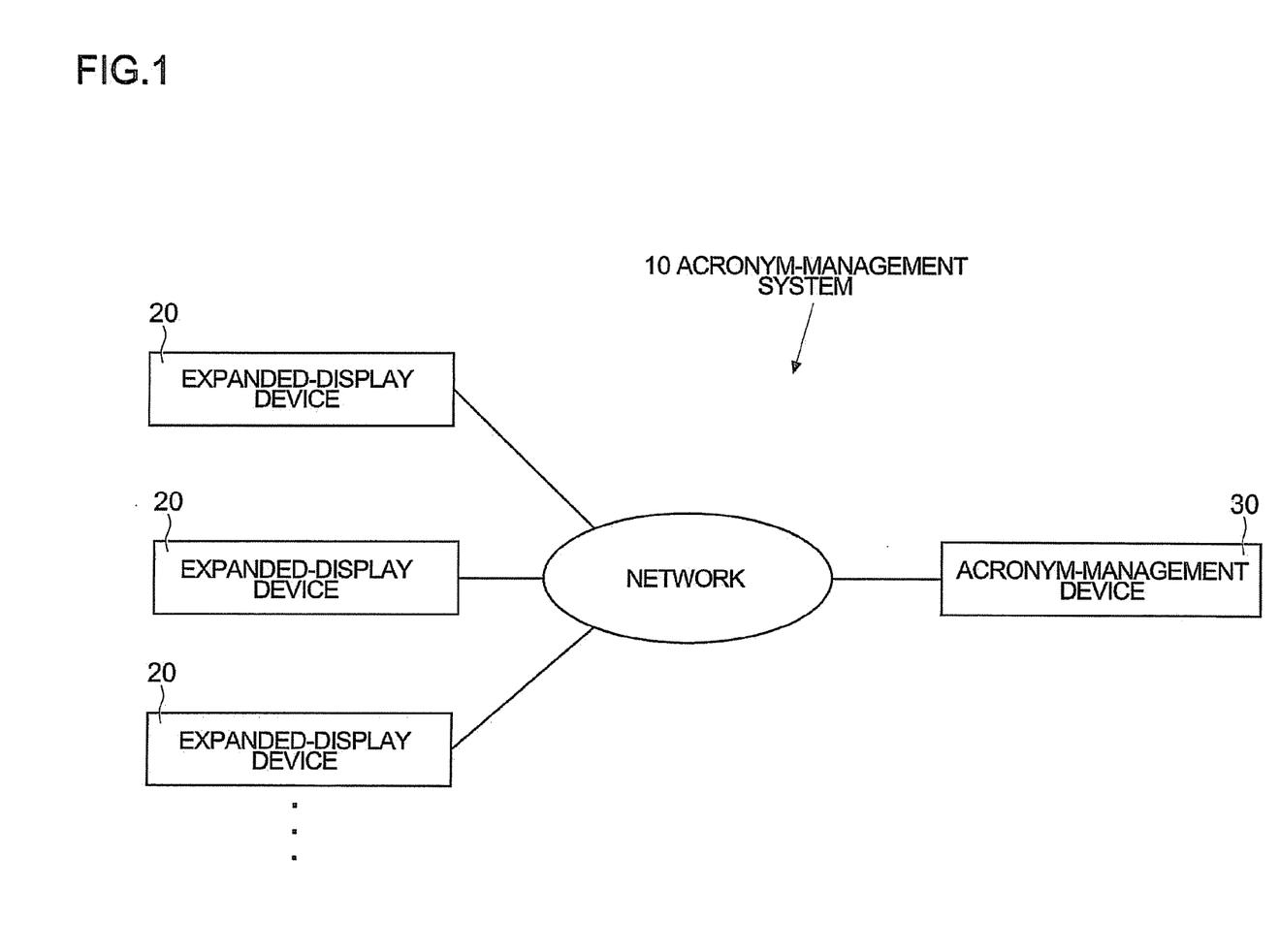
FIG. 1 shows a configuration of an acronym-management system pertaining to an embodiment of the present disclosure.

FIG. 1 shows the configuration of the acronym-management system 10 pertaining to the present embodiment.

As shown in FIG. 1, the acronym-management system 10 includes an expanded-display device 20 (equivalent to a computer) for displaying an expanded form corresponding to an acronym included in a reference. One or more expanded-display devices may be used. The acronym-management system 10 also comprises an acronym-management device 30 (equivalent to a computer) for managing acronyms and expanded forms corresponding thereto.

The plurality of expanded-display devices in the acronym-management system 10 and the acronym-management device 30 may communicate with each other via a network 11 such as the internet.

The configurations of each of the plurality of expanded-display devices 20 in the acronym-management system 10 are the same. Therefore, the description below pertains to one expanded-display device 20 representing the plurality of expanded-display devices in the acronym-management system 10.

Figure 2:
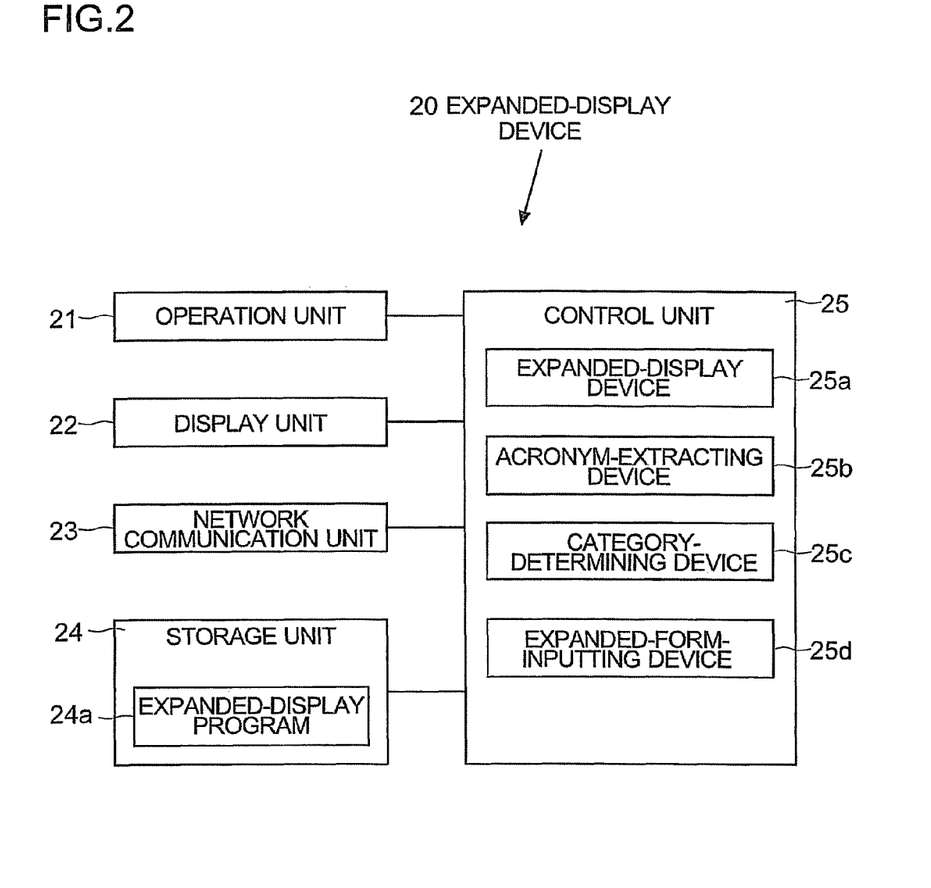
FIG. 2 shows a configuration of an expanded-display device shown in FIG. 1.

FIG. 2 shows the configuration of the expanded-display device 20.

As shown in FIG. 2, the expanded-display device 20 comprises an operation unit 21, a display unit 22, a network communication unit 23, a storage unit 24, and a control unit 25. The operation unit 21 is an input device such as a mouse or a keyboard by which a variety of operations are inputted. The display unit 22 is a display device such as a liquid crystal display (LCD) for displaying a variety of information. The network communication unit 23 is a communication device for communicating with external devices via the network 11 (refer to FIG. 1). The storage unit 24 is a storage device such as a hard disk drive (HDD) for storing programs and various data. The control unit 25 performs comprehensive control of the expanded-display device 20. The expanded display device 20 is a computer, e.g., a personal computer (PC).

The storage unit 24 stores an expanded-display program 24a for displaying expanded forms corresponding to acronyms. The expanded-display program 24a may be installed in the expanded-display device 20 (in the storage unit 24) in a step for manufacturing the expanded-display device 20, installed as an addition to the expanded-display device 20 from a storage medium such as a compact disc (CD) or a digital versatile disc (DVD), or installed (by downloading) as an addition to the expanded-display device 20 from the network 11. The storage unit 24 may also be a read-out device for reading from a storage medium such as a CD or DVD. Therefore, the expanded-display program 24a is stored on a permanent recording medium such as a HDD, CD, or DVD.

The control unit 25 comprises, for example, a central processing unit (CPU), a read-only memory (ROM) for storing programs and various data, and a random access memory (RAM) used as a work space for the CPU. The CPU executes programs stored in the ROM or the storage unit 24.

The control unit 25 executes the expanded-display program 24a stored in the storage unit 24. The CPU, ROM, RAM, and other circuits of the control unit 25 thereby operate based on processing established by the expanded-display program 24a. The control unit 25 functions as an expanded-display device 25a for causing expanded forms corresponding to acronyms to be displayed on the display unit 22; an acronym-extracting device 25b for extracting an acronym from a designated reference (reference data); a category-determining device 25c for determining a category for the designated reference; and an expanded-form-input device 25d for inputting (inserting or substituting), at the position of the acronym extracted from the designated reference, an expanded form corresponding to the acronym (indicating the meaning of the acronym).

Figure 3:
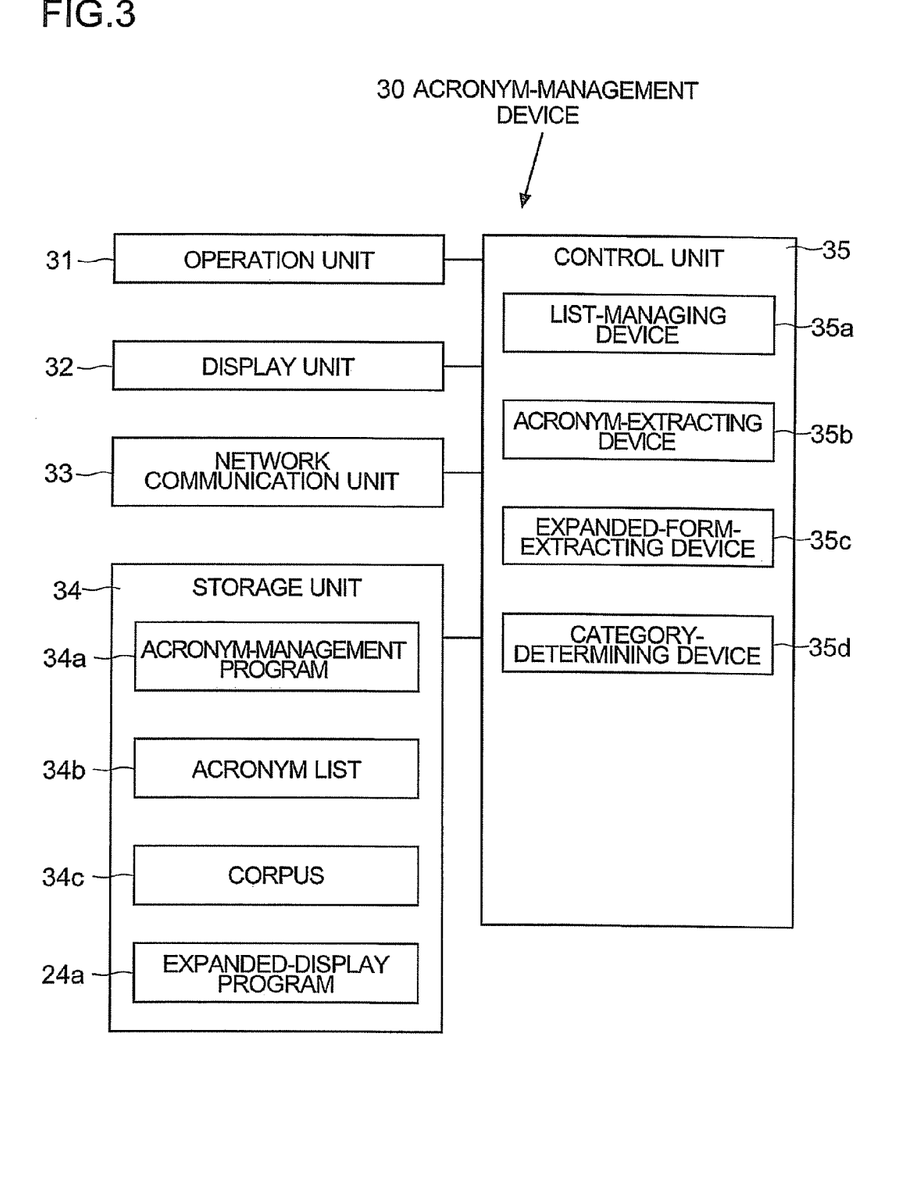
FIG. 3 shows a configuration of an acronym-management device shown in FIG. 1.

FIG. 3 shows the configuration of the acronym-management device 30.

As shown in FIG. 3, the acronym-management device 30 comprises an operation unit 31 that is an input device such as a mouse or a keyboard by which a variety of operations are inputted, a display unit 32 that is a display device such as an LCD for displaying a variety of information, a network communication unit 33 that is a network communication device for communicating with external devices via the network 11 (refer to FIG. 1), a storage unit 34 that is a storage device such as an HDD for storing programs and various data, and a control unit 35 for controlling the entire acronym-management device 30. The acronym-management device 30 is configured from a computer such as a PC.

The storage unit 34 stores an acronym-management program 34a for managing acronyms (an acronym list 34b) and expanded forms corresponding thereto. The acronym-management program 34a may be installed in the acronym-management device 30 in a step for manufacturing the acronym-management device 30, installed as an addition to the acronym-management device 30 from a storage medium such as a CD or DVD, or installed as an addition to the acronym-management device 30 from the network 11. The storage unit 34 may also be a read-out device for reading from a storage medium such as a CD or DVD. Therefore, the acronym-management program 34a is stored on a permanent recording medium such as a HDD, CD, or DVD.

The storage unit 34 also stores the acronym list 34b in which acronyms are listed. As shown in FIG. 3, the storage unit 34 stores a corpus 34c including a large volume of word information.

Figure 4:
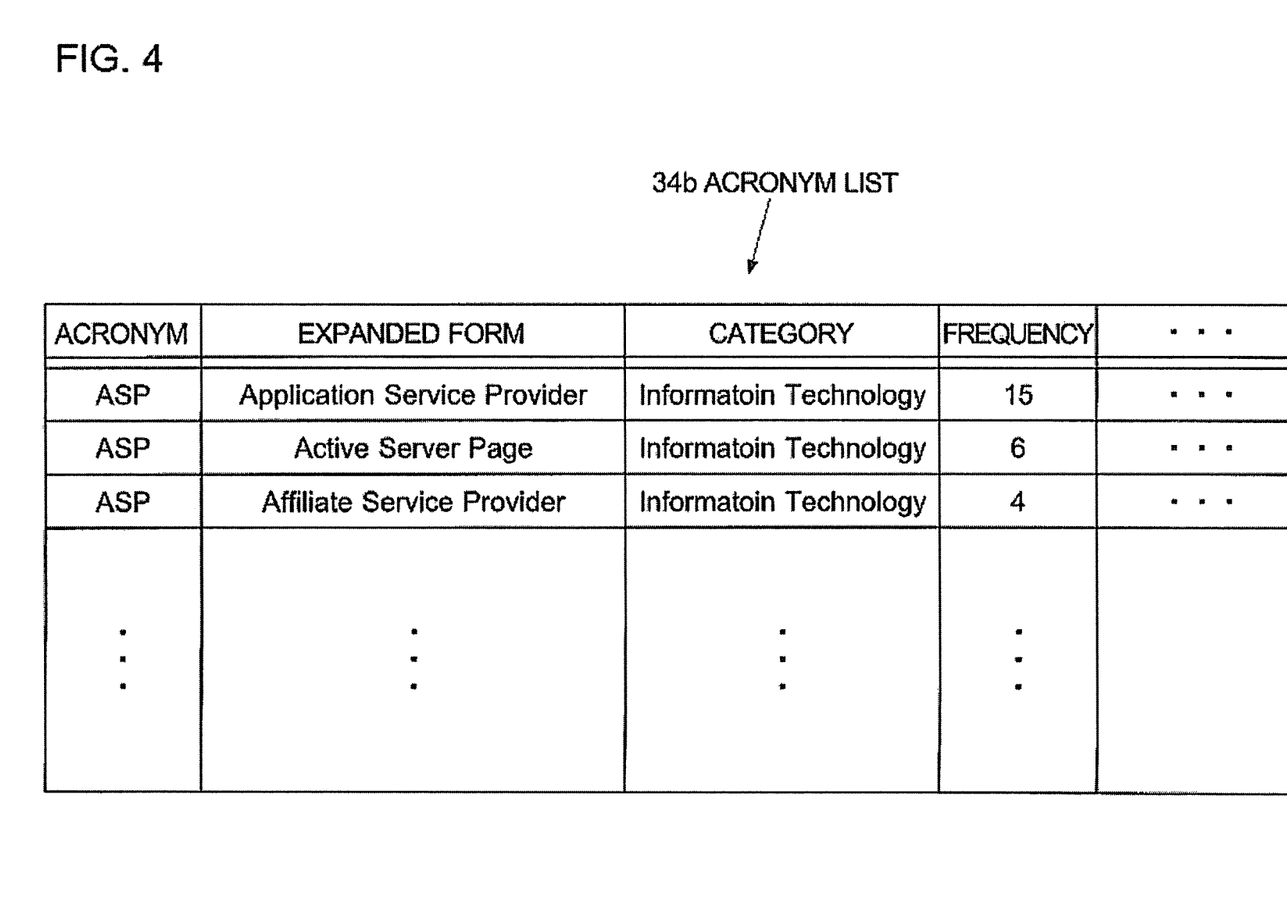
FIG. 4 shows an example of an acronym list.

FIG. 4 shows an example of the acronym list 34b. As shown in FIG. 4, at least acronyms, expanded forms corresponding thereto, categories of the acronyms referring to the expanded forms, and frequencies with which acronyms are used to refer to the expanded forms in references belonging to the categories are correlated in the acronym list 34b. The categories include, for example, "information technology" as shown in FIG. 4.

The control unit 35 comprises, for example, a CPU, a ROM for storing programs and various data, and a RAM used as a work space for the CPU. The CPU executes programs stored in the ROM or the storage unit 34.

The control unit 35 executes the acronym-management program 34a stored in the storage unit 34. The CPU, ROM, RAM, and other circuits of the control unit 35 thereby operate based on processing established by the acronym-management program 34a. The control unit 35 functions as a list-managing device 35a for managing the acronym list 34b; an acronym-extracting device 35b for extracting an acronym from a list-updating reference for updating the acronym list 34b; an expanded-form-extracting device 35c for extracting, from the list-updating reference, an expanded-form candidate corresponding to the acronym extracted from the list-updating reference by the acronym-extracting device 35b; and a category-determining device 35d for determining a category for the list-updating reference.

The operation of the acronym-management system 10 will be described below.

First, updating of the acronym list 34b will be described.

Figure 5A:
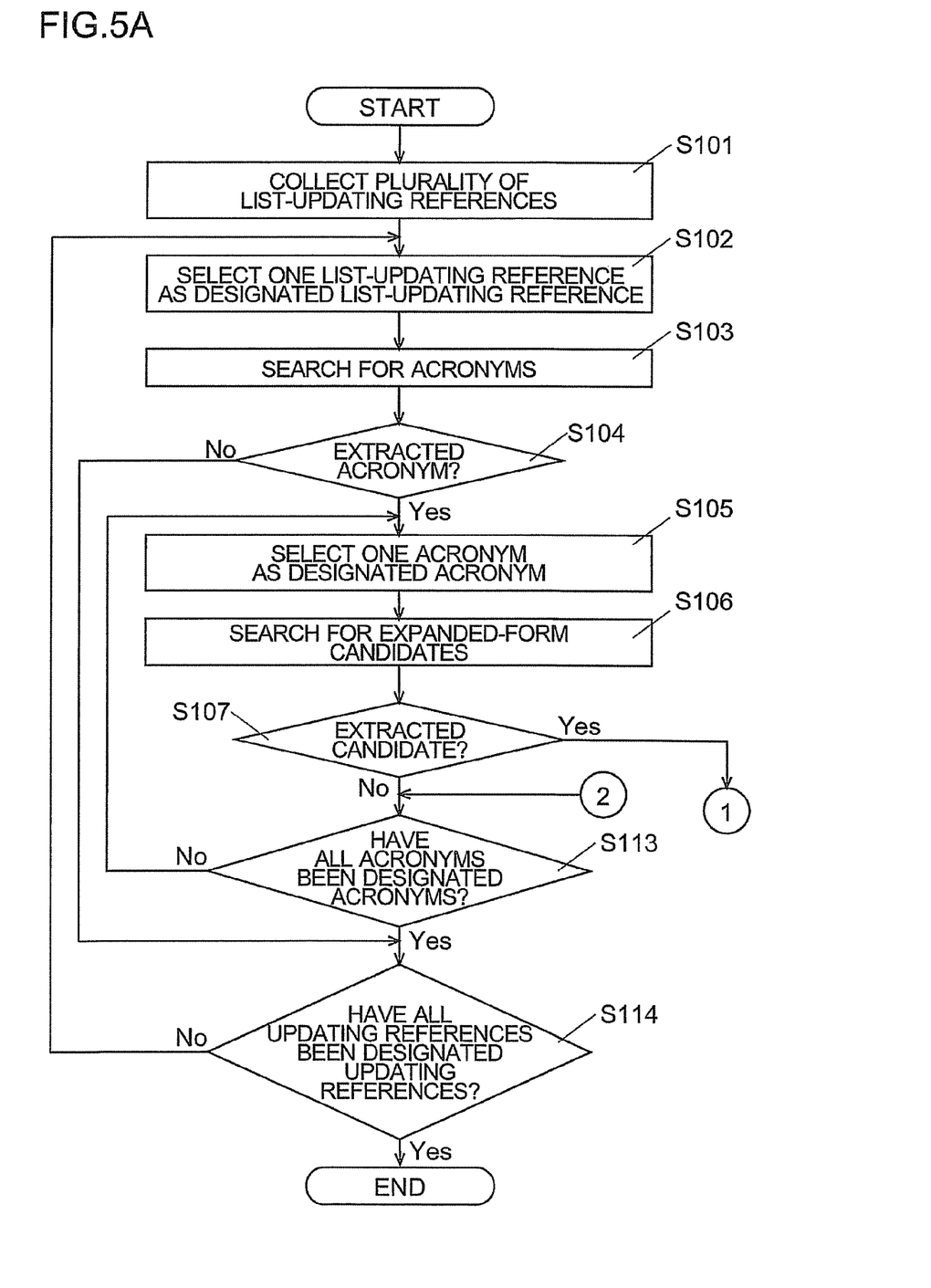
FIGS. 5A and 5B show steps in a process for updating the acronym list in the action of the acronym-management device shown in FIG. 3.
Figure 5B:
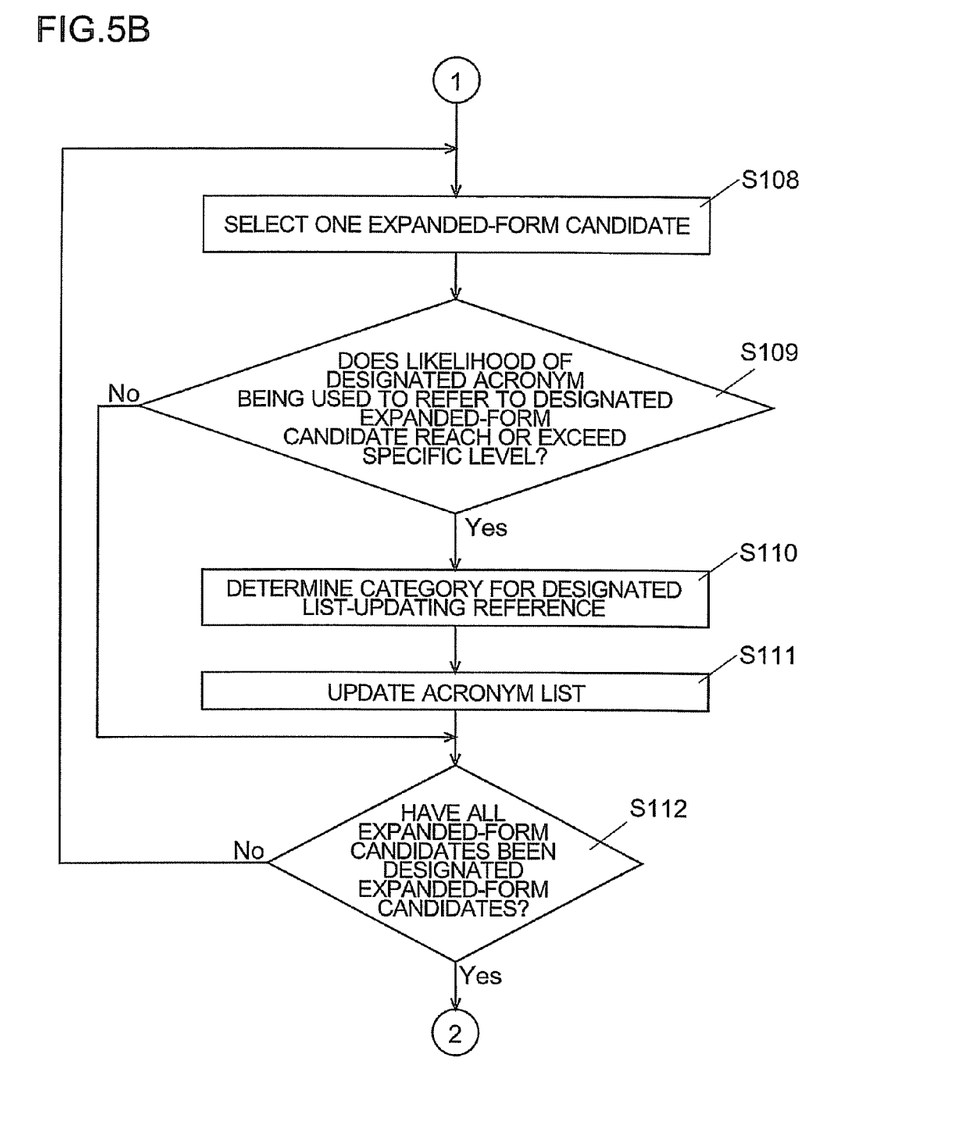

By executing the acronym-management program 34a in a specific period, the control unit 35 of the acronym-management device 30 periodically repeats the actions and processing shown in FIGS. 5A and 5B.

FIGS. 5A and 5B show steps in the action of the acronym-management device 30 when the acronym list 34b is updated.

As shown in FIG. 5A, the list-managing device 35a of the control unit 35 collects, based on specific conditions, multiple references as list-updating references from the Web via the network communication unit 33 (S101). The "specific conditions" may refer to websites; domain names of reference-sharing services or organizations such as newspaper companies and academic associations; or keywords. The specific conditions may be discretionally set by a user.

The control unit 35, functioning as the list-managing device 35a, then sets, as a designated list-updating reference, one from among a plurality of list-updating references collected in S101 yet to be designated in the processing (S102).

The control unit 35, functioning as the acronym-extracting device 35b, then executes a search for acronyms in the designated list-updating reference (S103). For example, the acronym-extracting device 35b may extract, as acronyms, words configured from only uppercase letters of the alphabet, the words having three or more letters.

The list-managing device 35a then determines whether an acronym was extracted in S103 (S104).

When it is determined in S104 that an acronym was extracted, the list-managing device 35a selects, as a designated acronym, one of the acronyms extracted in S103 yet to be designated in the processing (S105).

The control unit 35, functioning as the expanded-form-extracting device 35c, then executes a search in the designated list-updating reference for an expanded-form candidate corresponding to the designated acronym (S106). For example, the expanded-form-extracting device 35c may extract, as the expanded-form candidate, a phrase constituted by a plurality of words, the capital letters of each word corresponding to a letter in the designated acronym.

The list-managing device 35a then determines whether an expanded-form candidate was extracted in S106 (S107).

When the list-managing device 35a determines in S107 that an expanded-form candidate was extracted, the list-managing device 35a selects, as a designated expanded-form candidate, one of the expanded-form candidates extracted in S106 yet to be designated in the processing (S108).

The list-managing device 35a then determines, by analyzing the meaning of the designated list-updating reference, whether the likelihood of the designated acronym being used in the designated list-updating reference to refer to the designated expanded-form candidate reaches or exceeds a specific level (S109). The list-managing device 35a compares a sentence in which the designated acronym is included to a corresponding sentence in which the designated expanded-form candidate is included, the expanded-form candidate being included as the same type of element (e.g., subject or object) as the designated acronym. In the list-managing device 35a, a ratio at which at least a fixed number of the same or similar words (e.g., a noun) are included in the two sentences can be used as the likelihood of the designated acronym being used in the designated list-updating reference to refer to the designated expanded-form candidate. Here, "similar" refers to words having the same root form but differing between singular and plural forms, or the like. When there is a sentence indicating that the designated acronym in a list-updating reference has the designated expanded form, the list-managing device 35a can determine that the likelihood of the designated acronym being used in the designated list-updating reference to refer to the designated expanded-form candidate reaches or exceeds the specific level.

When the control unit 35 determines in S109 that the likelihood of the designated acronym being used in the designated list-updating reference to refer to the designated expanded-form candidate reaches or exceeds the specific level, the control unit 35, functioning as the category-determining device 35d, determines the category of the designated list-updating reference based on the corpus 34c (S110). For example, the category-determining device 35d may extract a category given in the corpus for the N words (e.g., nouns) occurring (appearing) most frequently in the list-updating reference, and determine that the category extracted most often is the category of the designated list-updating reference. "N" can, for example, be set to ten or the like. The category-determining device 35d can also extract a category given in the corpus for words (e.g., nouns) used in the title of the list-updating reference, and determine that the category extracted most often is the category of the designated list-updating reference.

The list-managing device 35a then increases by one, in the acronym list 34b, the frequency of correlation between the designated acronym, the expanded form that is the same as the designated expanded-form candidate, and the category determined in S110 (S111). When the combination of the designated acronym, the expanded form that is the same as the designated expanded-form candidate, and the category determined in S110 is not listed in the acronym list 34b, the list-managing device 35a executes the process of S111 by newly listing the designated acronym, the expanded form that is the same as the designated expanded-form candidate, the category determined in S110, and a frequency of "1" as correlated with the three. In other words, when the combination of the designated acronym and the expanded form determined to have a high likelihood does not appear in the determined-category portion of the acronym list 34b, the list-managing device 35a adds the combination of the designated acronym, the expanded form determined to have a high likelihood, and the category to the acronym list 34b.

When it is determined in S109 that the likelihood of the designated acronym being used in the designated list-updating reference to refer to the designated expanded-form candidate is less than the specific level, or when the process of S111 is completed, the list-managing device 35a determines whether all of the expanded-form candidates extracted in S106 have been designated expanded-form candidates (S112).

When an expanded-form candidate yet to be designated in the processing is determined in S112 to be present, the list-managing device 35a executes the process of S108. In other words, the flow returns to S108, the list-managing device 35a selects a different, uncategorized expanded form as a designated expanded form, and the processes from S108 onward are performed.

When it is determined in S107 that an expanded-form candidate was not extracted, or when it is determined in S112 that all of the expanded-form candidates extracted in S106 have been designated expanded-form candidates, the list-managing device 35a determines whether all of the acronyms extracted in S103 have been designated acronyms (S113).

When an acronym yet to be designated in the processing is determined in S113 to be present, the list-managing device 35a executes the process of S105. In other words, the flow returns to S105, the list-managing device 35a selects one from among the acronyms for which expanded-form candidates have not yet been searched as a designated acronym, and the processes from S105 onward are performed.

When it is determined in S104 that an acronym was not extracted, or when it is determined in S113 that all of the acronyms have been designated acronyms, the list-managing device 35a determines whether all of the plurality of list-updating references collected in S101 have been designated list-updating references (S114).

When a list-updating reference yet to be designated in the processing is determined in S114 to be present, the list-updating device 35a executes the process of S102. In other words, the flow returns to S102, the list-managing device 35a selects one from among the list-updating references for which acronyms have not yet been searched as a designated list-updating reference, and the processes from S102 onward are performed.

When it is determined in S114 that all of the list-updating references have been designated list-updating references, the list-managing device 35a completes (ends) the actions shown in FIGS. 5A and 5B.

An example was described above in which the list-managing device 35a increased the frequency established in the acronym list 34b by at most only one for each expanded-form candidate, even when a plurality of the same designated acronyms was included in one list-updating reference. However, it is also possible for the list-managing device 35a to adopt a different incrementing method as the method for increasing the frequency in the acronym list 34b. For example, when a plurality of the same designated acronyms is included (when the same acronym is written repeatedly) in one list-updating reference, the list-managing device 35*a* may increase the frequency in the acronym list 34*b* by the number of acronyms (by the number of times the acronym repeats), or increase the frequency in the acronym list 34*b* by the number of sentences including the acronym.

The display of the expanded forms corresponding to the acronyms will be described next.

Figure 6:
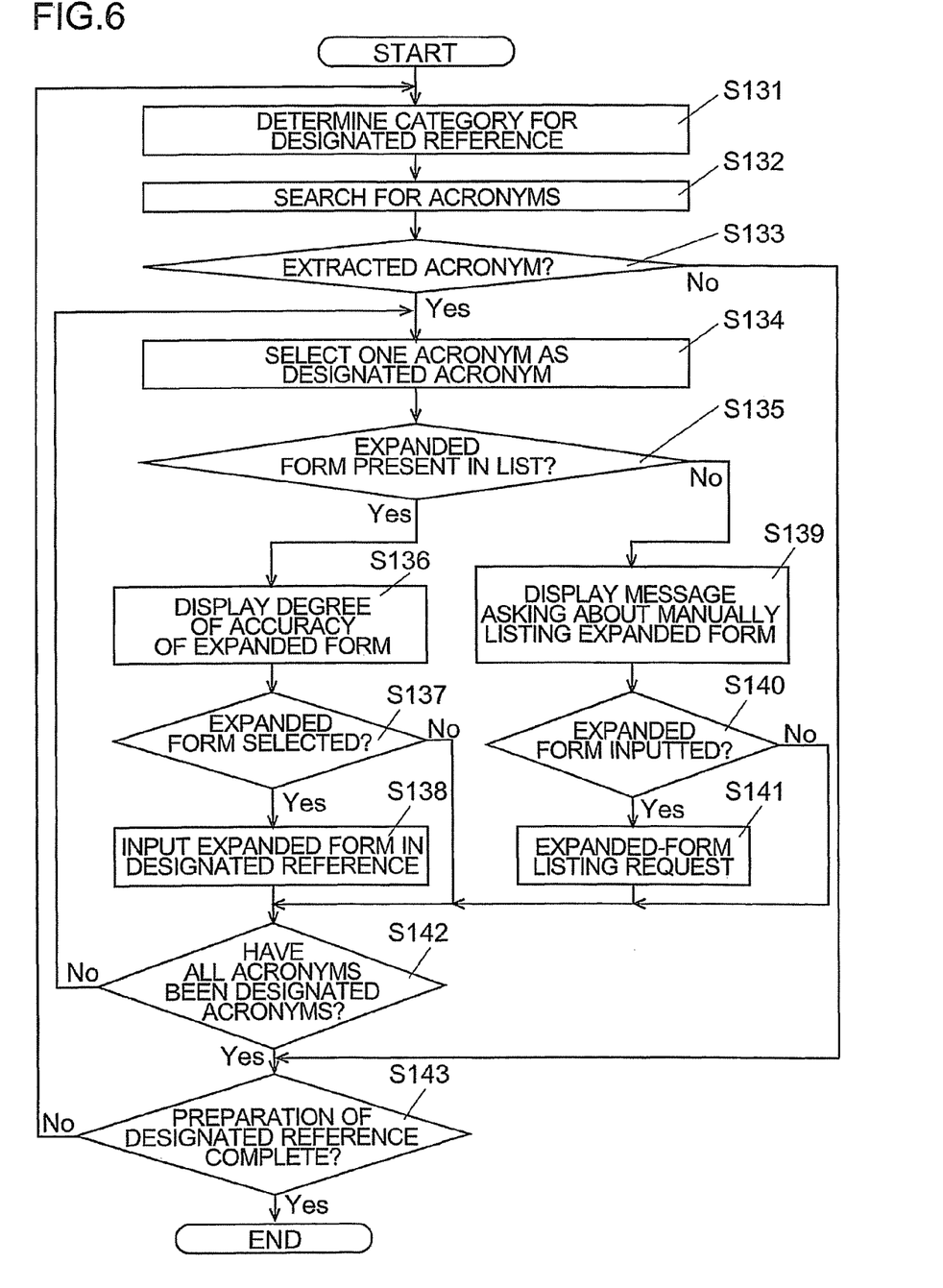
FIG. 6 shows steps in the action of the expanded-display device shown in FIG. 2 in a case in which expanded forms corresponding to acronyms are displayed.

By executing the expanded-display program 24*a* when a reference (reference data) is prepared via the operation unit 21 using reference-preparing software, email software, or another application, the expanded-display device 20 performs the actions and processing shown in FIG. 6.

FIG. 6 shows steps in the action of the expanded-display device 20 when the expanded form corresponding to the acronym is displayed.

As shown in FIG. 6, the control unit 25, functioning as the category-determining device 25*c*, determines the category of a reference being prepared (a designated reference) based on the corpus 34*c* in the acronym-management device 30. For example, the category-determining device 25*c* may extract a category given in the corpus for the N words, e.g., nouns, occurring most frequently in the reference being prepared, and determine that the category extracted most often is the category of the designated reference being prepared. "N" can, for example, be set to ten or the like. The category-determining device 25*c* can also extract a category given in the corpus for words, e.g., nouns, used in the title of the reference being prepared, and determine that the category extracted most often is the category of the designated reference being prepared.

The control unit 25, functioning as the acronym-extracting device 25*b*, then executes a search for acronyms in the designated reference (S132). For example, the acronym-extracting device 25*b* may extract, as acronyms, words configured from only uppercase letters of the alphabet, the words having three or more letters.

The control unit 25, functioning as the expanded-display device 25*a*, then determines whether an acronym was extracted in S132 (S133).

When it is determined in S133 that an acronym was extracted, the expanded-display device 25*a* selects, as a designated acronym, one of the acronyms extracted in S132 yet to be designated in the processing (S134).

The expanded-display device 25*a* then determines whether an expanded form correlated with the designated acronym and the category determined in S131 is present in the acronym list 34*b* of the acronym-management device (S135). At this time, the control unit 25 causes the network communication unit 23 of the expanded-display device 20 to communicate with the acronym-management device 30, and confirms the acronym list 34*b*.

When an expanded form is determined in S135 to be present, the expanded-display device 25*a* displays the expanded form and the degree of accuracy thereof on the display unit 22 (S136). The "degree of accuracy" is a value based on the frequency correlated in the acronym list 34*b*. Specifically, in the example of the present embodiment, the degree of accuracy is the probability, based on the frequency established in the acronym list 34*b*, that the designated acronym is being used to refer to the displayed expanded form. The frequency (degree of accuracy) is correlated with the designated acronym, the category to which the designated acronym belongs, and the expanded form of the designated acronym, and is stored in the acronym list 34*b*.

Figure 7A:
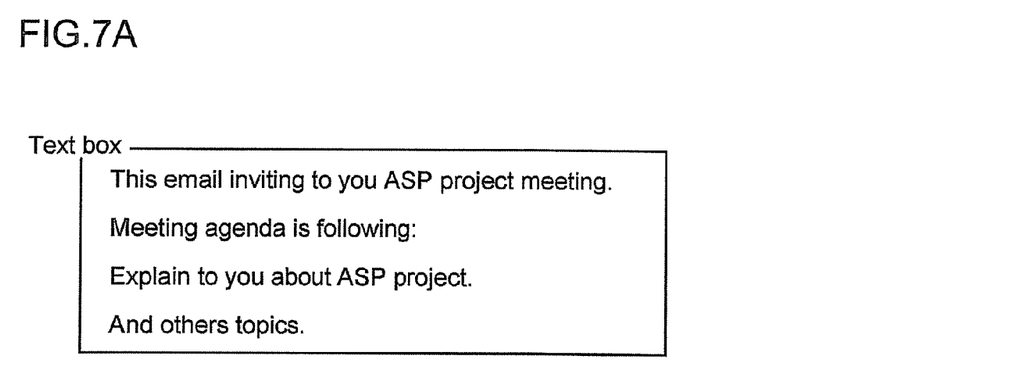
FIG. 7A shows an example of a designated reference displayed by a display unit shown in FIG. 2.
Figure 7B:
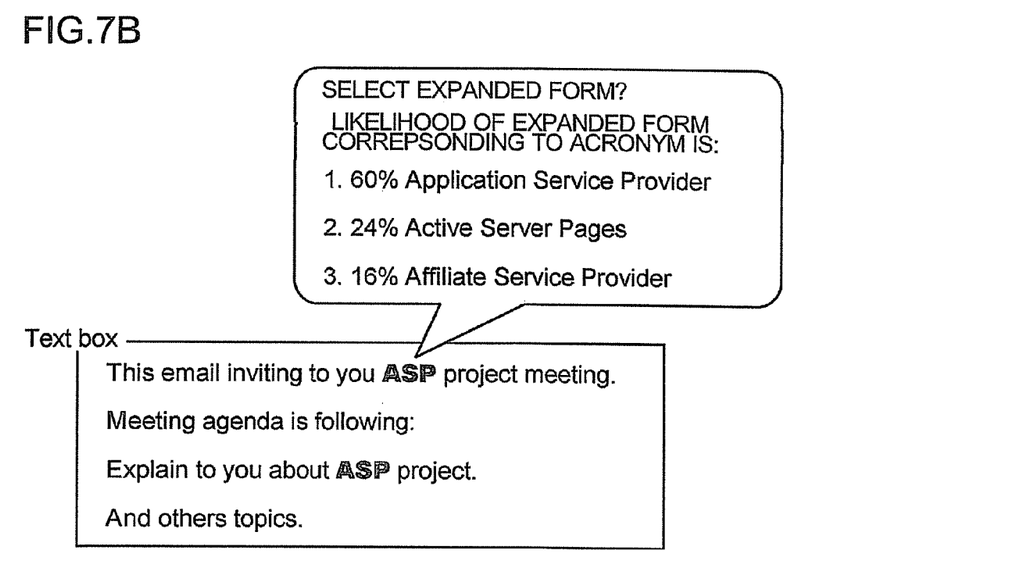
FIG. 7B shows a state in which expanded forms and the degree of accuracy thereof are displayed in the designated reference shown in FIG. 7A.

For example, when the designated reference includes the acronym "ASP" as shown in FIG. 7A, the expanded-display device 25*a* displays the expanded forms corresponding to "ASP" and the degrees of accuracy thereof on the display unit 22 as shown in FIG. 7B.

In FIG. 7B, the expanded forms (expanded-form candidates) of "ASP" are "application service provider," "active server pages," and "affiliate service provider." The degrees of accuracy thereof are "60%," "24%," and "16%." Specifically, FIG. 7B displays that "according to the values of the frequencies stored in the acronym list 34*b*, the acronym "ASP" has a 60% probability of being used to refer to "application service provider," a 24% probability of being used to refer to "active server pages," and a 16% probability of being used to refer to "affiliate service provider," in the category of the designated reference."

The expanded-display device 25*a* can calculate the degree of accuracy from ratios in the acronym list 34*b*. Specifically, the expanded-display device 25*a* determines, for each expanded-form candidate in the acronym list 34*b*, a ratio of the frequency of each expanded-display candidate to sum total of the frequencies (a value accumulated by updates in the flow of FIG. 5) of each expanded-form candidate having the same category and the same acronym. For example, in the acronym list 34*b* shown in FIG. 4, the frequencies of the expanded forms "application service provider," "active server pages," and "affiliate service provider" are 15, 6, and 4, respectively. Therefore, the expanded-display device 25*a* calculates the degree of accuracy of "application service provider" as $15/(15+6+4) \times 100$, or specifically, 60%. The expanded-display device 25*a* calculates the degree of accuracy of "active server pages" as $6/(15+6+4) \times 100$, or specifically, 24%. The expanded-display device 25*a* calculates the degree of accuracy of "affiliate service provider" as $4/(15+6+4) \times 100$, or specifically, 16%.

The expanded-display device 25*a* may display the degree of accuracy in a form other than a percentage. For example, the expanded-display device 25*a* may display the frequency itself (cumulative total) from the acronym list 34*b* as the degree of accuracy.

As shown in FIG. 6, after the process of S136, the control unit 25, functioning as the expanded-form-input device 25*d*, determines whether any one from among the expanded forms displayed in S136 is selected via the operation unit 21. This selection is accepted by the operation unit 21.

When it is determined in S137 that any one from among the expanded forms is selected, the expanded-display-input device 25*d* inputs the selected expanded form at the position, in the designated reference, of the acronym serving as the basis of the display of the expanded forms (S138).

Figure 8:
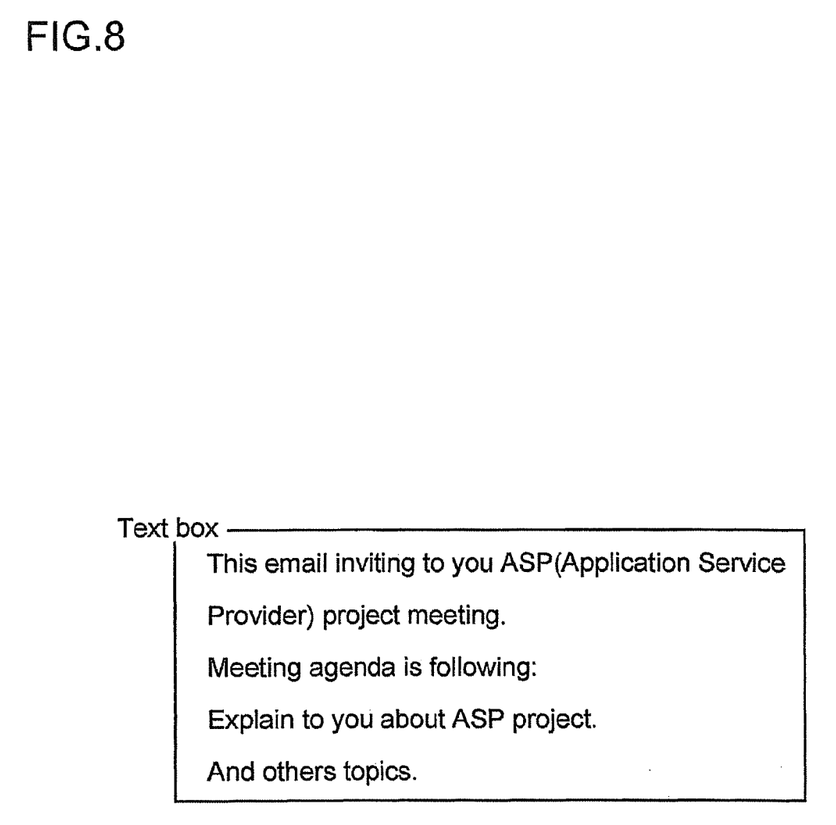
FIG. 8 shows a state in which an expanded form is added to the designated reference shown in FIG. 7A.

For example, when "application service provider" in FIG. 7B is selected, the expanded-form-input device 25*d* inputs, as shown in FIG. 8, the expanded form "application service provider" at the position of the acronym "ASP" that serves as the basis of the display of "application service provider." In the example of FIG. 8, the expanded-form-input device 25*d* displays the expanded form without deleting the acronym "ASP," inputting the expanded form by attaching a character string including the selected expanded form in parentheses to the designated acronym.

When it is determined in S135 that no expanded form is present, the control unit 25 displays a message on the display unit 22 asking whether to an expanded form is to be manually listed (S139).

The control unit 25 then determines whether an expanded form has been inputted via the operation unit 21 (S140). When a cancel instruction is inputted via the operation unit 21, the control unit 25 determines in S140 that no expanded form has been inputted.

When it is determined in S140 that an expanded form has been inputted, the control unit 25 transmits, to the acronym-management device 30 via the network communication unit 23, expanded-form-listing-request information requesting that the expanded form inputted via the operation unit 21 be listed in the acronym list 34b (S141). The expanded-form-listing-request-information includes the expanded form inputted via the operation unit 21 (data indicating the expanded form), the designated acronym (data indicating the acronym), and the category determined in S131 (data indicating the category).

The control unit 35 of the acronym-management device 30 receives, via the network communication unit 33, the expanded-form listing request information transmitted from the expanded-display device 20. Upon receipt, the control unit 35 newly lists the combination of the acronym, the expanded form, and the category included in the expanded-form listing request information in the acronym list with a frequency of "1." The expanded form manually thus listed may be listed in the acronym list 34b as an expanded form used in S135 for only the user who requested the listing, or may be listed in the acronym list 34b as an expanded form used in S135 for only members of an organization to which the user who requested the listing belongs.

When it is determined in S137 that any expanded form was selected, when the process of S138 is completed, when it is determined in S140 that an expanded form has been inputted, or when the process of S141 is completed, the expanded-display device 25a determines whether all of the acronyms extracted in S132 have been designated acronyms (S142).

When it is determined in S142 that an acronym yet to be designated in the processing is present, the expanded-display device 25a executes the process of S134. In other words, the flow returns to S134, the expanded-display device 25a selects an acronym yet to be designated in the processing as the next designated acronym, and the processes from S134 onward are performed.

When it is determined in S133 that no acronym was extracted, or when it is determined in S142 that all of the acronyms have been designated acronyms, the expanded-display device 25a determines whether the preparation of the designated reference is complete (S143).

When it is determined in S143 that the preparation of the designated reference is not complete, the category-determining device 25c executes the process of S131. In other words, the flow returns to S131, the category-determining device 25c selects a designated reference yet to be designated in the processing as the next designated reference, and the processes from S131 onward are performed.

When it is determined in S143 that the preparation of the designated reference is complete, the expanded-display device 25a completes the actions shown in FIG. 6.

As described above, because the acronym list 34b is automatically updated based on the list-updating reference (S101 to S114), the acronym-management device 30 can provide an acronym list 34b for presenting (S136), to a user, expanded forms corresponding to acronyms included in references belonging to specific categories and the degrees of accuracy of the expanded forms as based on the frequencies with which the acronyms are used to refer to the expanded forms.

Furthermore, because the expanded forms correlated with the acronyms extracted from the designated references are displayed (S136) together with the degrees of accuracy based on the frequencies correlated in the acronym list 34b with the acronyms, the categories of the designated references, and the expanded forms, the expanded-display device 20 can present, to the user, the expanded forms corresponding to the acronyms included in the designated references belonging to the specific categories along with the degrees of accuracy of the expanded forms.

The expanded-display device 20 can present the expanded forms corresponding to the acronyms included in the references and the degrees of accuracy of the expanded forms to the user by using the acronym list 34b even when the categories of the references are not correlated in the acronym list 34b. However, by correlating the categories of the references in the acronym list 34b, the expanded-display device 20 can more appropriately present the expanded forms corresponding to the acronyms included in the references and the degrees of accuracy of the expanded forms to the user by using the acronym list 34b.

Because the expanded forms corresponding to the acronyms are inputted (displayed alongside as candidates (S138)) at the position of the acronym in the designated reference, the expanded-form device 20 can simplify correction of the designated reference.

In the present embodiment, the expanded-display device 20 takes a reference being prepared as a designated reference. Therefore, a user of the expanded-display device 20 can prepare a reference after confirming what the acronym used in the reference being prepared is typically used to refer to. For example, the user of the expanded-display device 20 can choose to prepare a reference without using an acronym that may be misunderstood, or choose to prepare a reference in which an acronym that may be misunderstood, selected from among acronyms defined by the user from the expanded forms, is redefined as a different acronym based on the expanded form.

In the present embodiment, a reference being prepared is taken as the designated reference, but the expanded-display device 20 may also take a reference that is merely being browsed as the designated reference.

Furthermore, in the present embodiment, words configured from only uppercase letters of the alphabet, the words having three or more letters, were extracted as acronyms, but the method for extracting acronyms is not limited to this. For example, words configured from only uppercase letters of the alphabet, the words having two or more letters, may be extracted as acronyms.

In the present embodiment, different computers are used for the expanded-display device 20 and the acronym-management device 30, but a single computer may also be used for both. For example, the acronym-management device 30 may include the expanded-display program 24a and all of the configuration shown in FIG. 3, perform all of the processes shown in FIG. 6, and be provided with all of the functions of the expanded-display device 20.

What is claimed is:

1. A non-transitory computer-readable storage medium for storing an acronym-management program for causing a computer to function as:

a list-managing device that manages an acronym list in which an acronym, an expanded form corresponding to the acronym, and the frequency with which the acronym is used to refer to the expanded form are correlated;

an acronym-extracting device that extracts the acronym from a plurality of list-updating references for updating the acronym list;

an expanded-form-extracting device that extracts, from a designated list-updating-reference out of the plurality of list-updating-references, a candidate for the expanded form corresponding to the acronym extracted from the designated list-updating reference from which the acronym has been extracted; and the list-managing device that increases, in the acronym list, the frequency correlated with the acronym and the expanded form when the likelihood of the acronym extracted from the list-updating reference being used in the list-updating reference to refer to the extracted expanded-form candidate reaches or exceeds a specific level; and the program causing the computer to function as a category-determining device that extracts a category given in a corpus for each of N words occurring most frequently in the designated list-updating reference, and determines that a category extracted most often is a category of the designated list-updating reference;

the acronym, the expanded form, and the category being correlated in the acronym list; and the program causing the computer to function as the list-managing device that increases, in the list, the frequency as correlated with the acronym, the expanded form, and the category when the likelihood of the acronym extracted from the list-updating reference being used in the list-updating reference to refer to the extracted expanded-form candidate reaches or exceeds a specific level.

2. The non-transitory computer-readable storage medium of claim 1, the program causing the computer to function as:

an expanded-display device that displays the expanded form corresponding to the acronym;

the acronym-extracting device that extracts the acronym from a designated reference; and the expanded-display device that displays the expanded form correlated in the acronym list with the acronym extracted from the designated reference along with a degree of accuracy based on the frequency;

the degree of accuracy being a value correlated with the acronym and the expanded form in the acronym list.

3. The non-transitory computer-readable storage medium of claim 1, the program causing the computer to function as:

an expanded-display device that displays the expanded form corresponding to the acronym;

the acronym-extracting device that extracts the acronym from a designated reference;

the category-determining device that determines a category for the designated reference; and the expanded-display device that displays the expanded form correlated in the acronym list with the acronym extracted from the designated reference and the determined category of the designated reference along with a degree of accuracy based on the frequency;

the degree of accuracy being a value correlated with the acronym, the determined category of the designated reference, and the expanded form in the acronym list.

4. The non-transitory computer-readable storage medium of claim 2, the program causing the computer to function as the expanded-form-inputting device that inputs the expanded form selected from among the displayed expanded forms at the position, in the designated reference, of the acronym serving as the basis of the display of the expanded forms.

5. The non-transitory computer-readable storage medium of claim 3, the program causing the computer to function as the category-determining device that either extracts a category given in a corpus for each of N words occurring most frequently in the designated reference being prepared, and determines that a category extracted most often is a category of the designated list-updating reference being prepared, or extracts a category given in the corpus for a word used in a title of the designated reference being prepared, and determines that a category extracted most often is a category of the designated reference being prepared.

6. An acronym-management device comprising:

a list-managing device that manages an acronym list in which an acronym, an expanded form corresponding to the acronym, and the frequency with which the acronym is used to refer to the expanded form are correlated;

an acronym-extracting device that extracts the acronym from a plurality of list-updating references for updating the acronym list; and an expanded-form-extracting device that extracts, from a designated list-updating-reference out of the plurality of list-updating references, a candidate for the expanded form corresponding to the acronym extracted from the designated list-updating reference from which the acronym has been extracted;

the list-managing device increasing, in the acronym list, the frequency correlated with the acronym and the expanded form when the likelihood of the acronym extracted from the list-updating reference by the acronym-extracting device being used in the list-updating reference to refer to the expanded-form candidate extracted by the expanded-form-extracting device reaches or exceeds a specific level; and a category-determining device that extracts a category given in a corpus for each of N words occurring most frequently in the designated list-updating reference, and determines that a category extracted most often is a category of the designated list-updating reference;

the acronym, the expanded form, and the category being correlated in the acronym list; and the list-managing device increasing, in the list, the frequency as correlated with the acronym, the expanded form, and the category when the likelihood of the acronym extracted from the list-updating reference being used in the list-updating reference to refer to the extracted expanded-form candidate reaches or exceeds a specific level.

7. A non-transitory computer-readable storage medium for storing an expanded-display program for causing a computer to function as:

an acronym-extracting device that extracts an acronym from a designated reference;

a category-determining device that extracts a category given in a corpus for each of N words occurring most frequently in the designated reference, and determines that a category extracted most often is a category of the designated reference; and an expanded-display device that displays an expanded form corresponding to the acronym by using an acronym list in which the expanded form corresponding to the acronym and the frequency with which the acronym is used to refer to the expanded form are correlated; and the expanded-display device using the acronym list, in which the acronym, the expanded form, the frequency, and the category are correlated, to display the expanded form correlated with the acronym extracted from the designated reference and the determined category of the designated reference in the acronym list, along with a degree of accuracy based on the frequency;

the degree of accuracy being a value correlated with the acronym, the category and the expanded form in the acronym list.

8. The non-transitory computer-readable storage medium of claim 7, the program causing the computer to function as an expanded-form-inputting device that inputs the expanded form selected from among the displayed expanded forms at the position, in the designated reference, of the acronym serving as the basis of the display of the expanded form.

9. An expanded-display device comprising:

an expanded-display device that displays an expanded form corresponding to an acronym by using an acronym list in which the acronym, the expanded form corresponding to the acronym, and the frequency with which the acronym is used to refer to the expanded form are correlated; and an acronym-extracting device that extracts the acronym from a designated reference; and a category-determining device that extracts a category given in a corpus for each of N words occurring most frequently in the designated reference, and determines that a category extracted most often is a category of the designated reference;

the expanded-display device displaying the expanded form correlated in the acronym list with the acronym extracted from the designated reference by the acronym-extracting device along with a degree of accuracy based on the frequency correlated with the acronym and the expanded form in the acronym list;

the expanded-display device using the acronym list, in which the acronym, the expanded form, the frequency, and the category are correlated, to display the expanded form correlated with the acronym extracted from the designated reference and the determined category of the designated reference in the acronym list, along with a degree of accuracy based on the frequency;

the degree of accuracy being a value correlated with the acronym, the category, and the expanded form in the acronym list.

10. A non-transitory computer-readable storage medium for storing an acronym-management program for causing a computer to function as:

a list-managing device that manages an acronym list in which an acronym, an expanded form corresponding to the acronym, and the frequency with which the acronym is used to refer to the expanded form are correlated;

an acronym-extracting device that extracts the acronym from a plurality of list-updating references for updating the acronym list;

an expanded-form-extracting device that extracts, from a designated list-updating-reference out of the plurality of list-updating-references, a candidate for the expanded form corresponding to the acronym extracted from the designated list-updating reference from which the acronym has been extracted; and the list-managing device that increases, in the acronym list, the frequency correlated with the acronym and the expanded form when the likelihood of the acronym extracted from the list-updating reference being used in the list-updating reference to refer to the extracted expanded-form candidate reaches or exceeds a specific level; and the program causing the computer to function as the list-managing device that compares, out of the designated list-updating reference, a sentence including the extracted acronym as a subject or an object and a sentence including the extracted candidate for the expanded form as a subject or an object, that, when the sentences both include a fixed number of or more same or similar words, determines that the likelihood of the designated acronym being used in the designated list-updating reference to refer to the designated expanded-form candidate reaches or exceeds a specific level, and that increases the frequency correlated with the acronym and the expanded form in the acronym list.

11. A non-transitory computer-readable storage medium for storing an acronym-management program for causing a computer to function as:

a list-managing device that manages an acronym list in which an acronym, an expanded form corresponding to the acronym, and the frequency with which the acronym is used to refer to the expanded form are correlated;

an acronym-extracting device that extracts the acronym from a plurality of list-updating references for updating the acronym list;

an expanded-form-extracting device that extracts, from a designated list-updating-reference out of the plurality of list-updating-references, a candidate for the expanded form corresponding to the acronym extracted from the designated list-updating reference from which the acronym has been extracted; and the list-managing device that increases, in the acronym list, the frequency correlated with the acronym and the expanded form when the likelihood of the acronym extracted from the list-updating reference being used in the list-updating reference to refer to the extracted expanded-form candidate reaches or exceeds a specific level; and the program causing the computer to function as the list-managing device that, when the designate list-updating-reference includes a sentence indicating that the expanded form corresponds to the extracted acronym, determines that the likelihood of the designated acronym being used in the designated list-updating reference to refer to the designated expanded-form candidate reaches or exceeds a specific level, and that increases the frequency correlated with the acronym and the expanded form in the acronym list.

12. A non-transitory computer-readable storage medium for storing an acronym-management program for causing a computer to function as:

a list-managing device that manages an acronym list in which an acronym, an expanded form corresponding to the acronym, and the frequency with which the acronym is used to refer to the expanded form are correlated;

an acronym-extracting device that extracts the acronym from a plurality of list-updating references for updating the acronym list;

an expanded-form-extracting device that extracts, from a designated list-updating-reference out of the plurality of list-updating-references, a candidate for the expanded form corresponding to the acronym extracted from the designated list-updating reference from which the acronym has been extracted; and the list-managing device that increases, in the acronym list, the frequency correlated with the acronym and the expanded form when the likelihood of the acronym extracted from the list-updating reference being used in the list-updating reference to refer to the extracted expanded-form candidate reaches or exceeds a specific level; and the program causing the computer to function as a category-determining device that extracts a category given in a corpus for a word used in a title of the designated list-updating reference, and determines that a category extracted most often is a category of the designated list-updating reference;

the acronym, the expanded form, the frequency, and the category being correlated in the acronym list; and the program causing the computer to function as the list-managing device that, when the likelihood of the acronym extracted from the list-updating reference being used in the list-updating reference to refer to the extracted expanded-form candidate reaches or exceeds a specific level, increases the frequency correlated with the acronym and the expanded form in the acronym list.

* * * * *